United States Patent
Kumaki

(10) Patent No.: US 7,355,631 B2
(45) Date of Patent: Apr. 8, 2008

(54) CAMERA SHAKE CORRECTION DEVICE AND IMAGING APPARATUS HAVING THE SAME

(75) Inventor: Jinyo Kumaki, Tokyo (JP)

(73) Assignee: Sony Corporation, Tokyo (JP)

( * ) Notice: Subject to any disclaimer, the term of this patent is extended or adjusted under 35 U.S.C. 154(b) by 801 days.

(21) Appl. No.: 10/753,236

(22) Filed: Jan. 6, 2004

(65) Prior Publication Data

US 2004/0189815 A1  Sep. 30, 2004

(30) Foreign Application Priority Data

Jan. 8, 2003  (JP) ............................. 2003-002593

(51) Int. Cl.
*H04N 5/228* (2006.01)
(52) U.S. Cl. ............................................... 348/208.99
(58) Field of Classification Search .......... 348/208.99, 348/208.8, 208.3, 208.4; 396/55; 382/260, 382/263

See application file for complete search history.

(56) References Cited

U.S. PATENT DOCUMENTS

| | | | | |
|---|---|---|---|---|
| 5,953,544 A | * | 9/1999 | Kai et al. ...................... | 396/55 |
| 6,078,751 A | * | 6/2000 | Yamazaki et al. ............ | 396/55 |
| 6,198,504 B1 | * | 3/2001 | Nobuoka ................... | 348/208.3 |
| 6,278,842 B1 | * | 8/2001 | Yamazaki et al. ............ | 396/55 |
| 6,473,566 B2 | * | 10/2002 | Kasuya ......................... | 396/55 |
| 6,628,898 B2 | * | 9/2003 | Endo ............................ | 396/51 |
| 6,704,502 B2 | * | 3/2004 | Morofuji ...................... | 396/55 |
| 6,734,901 B1 | * | 5/2004 | Kudo et al. ............... | 348/208.4 |
| 6,734,902 B1 | * | 5/2004 | Kawahara ................ | 348/208.8 |
| 6,735,383 B2 | * | 5/2004 | Imada .......................... | 396/55 |
| 6,982,746 B1 | * | 1/2006 | Kawahara ............. | 348/208.99 |
| 7,064,777 B2 | * | 6/2006 | Yamazaki ................ | 348/208.5 |
| 7,209,165 B2 | * | 4/2007 | Ishikawa ............... | 348/208.99 |

* cited by examiner

*Primary Examiner*—Lin Ye
*Assistant Examiner*—Amy Hsu
(74) *Attorney, Agent, or Firm*—Frommer Lawrence & Haug LLP; William S. Frommer; Paul A. Levy

(57) ABSTRACT

The present invention provides a camera shake correction device enabled to quickly correct a camera shake. This device has a sensor for detecting movement of a camera, a high-pass filter, an amplifier, an A/D converter, a camera-shake/pan/tilt detection unit, and a switching unit. The filter includes a circuit having a capacitor and a resistor connected in series. A reference voltage is inputted to a common ground terminal of the circuit. An output signal of the sensor is amplified by the amplifier. The A/D converter converts the amplified signal into a digital value. The detection unit detects a camera shake or panning/tilting according to the digital value. When detected, the switching unit turns on a switch connected to the resistor so as to discharge the capacitor to the reference voltage.

12 Claims, 6 Drawing Sheets

F I G. 2
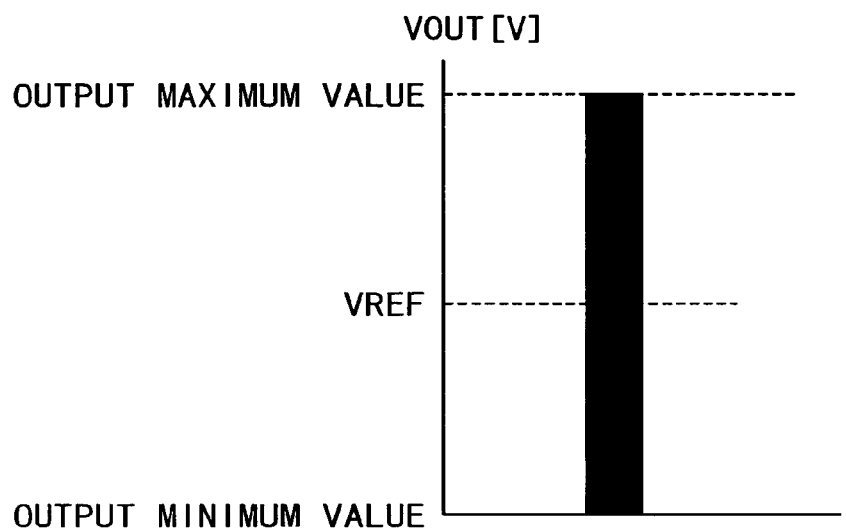
F I G. 3
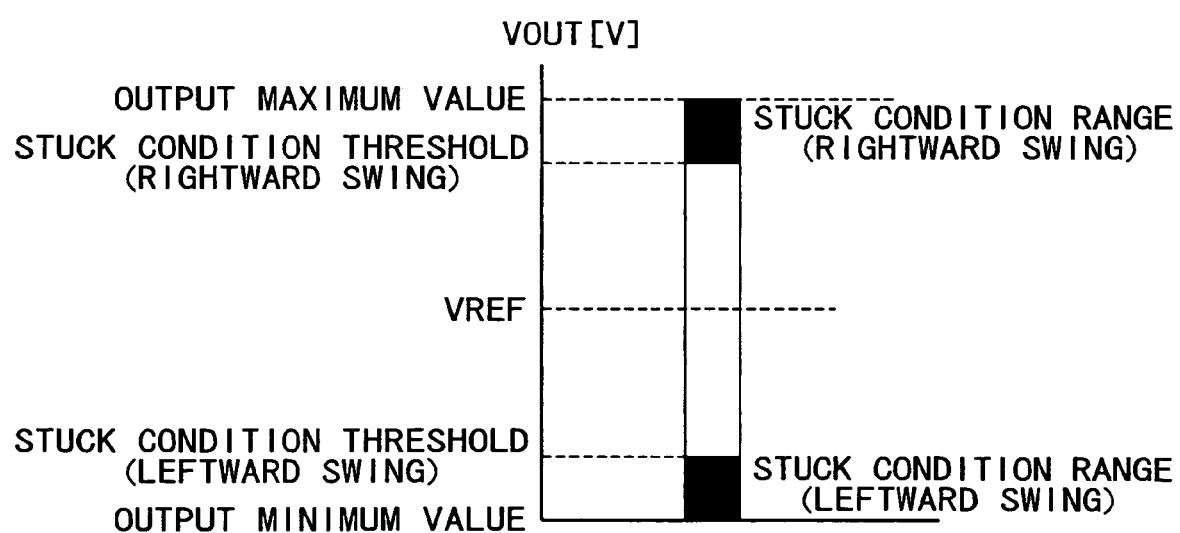

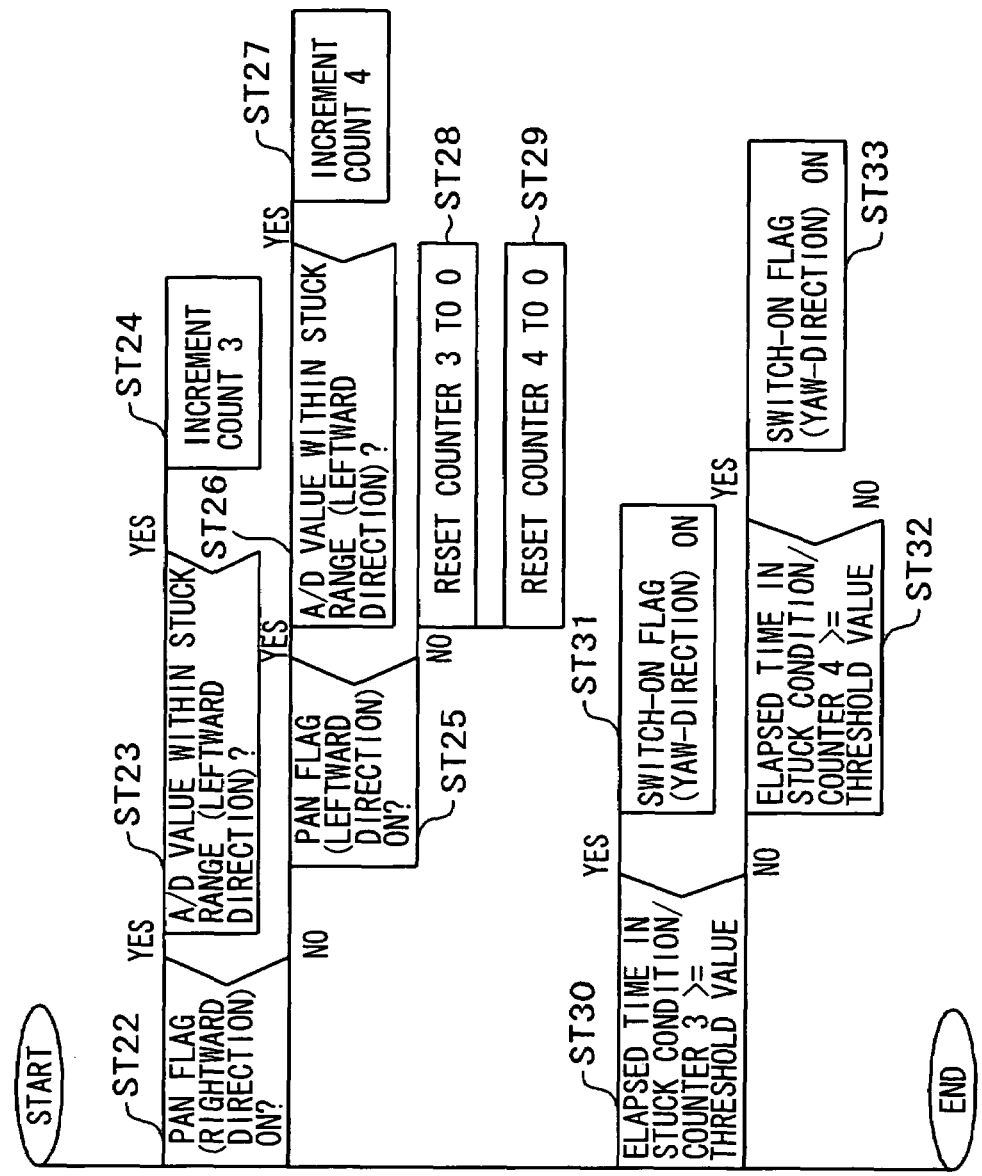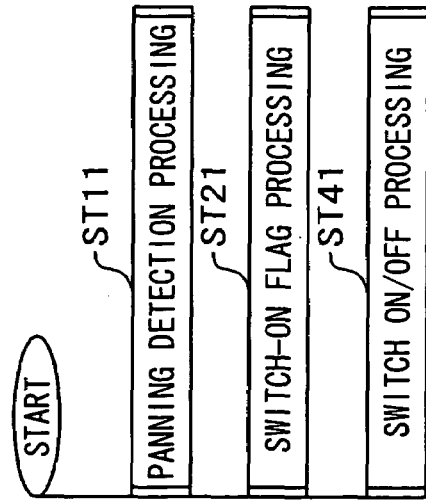

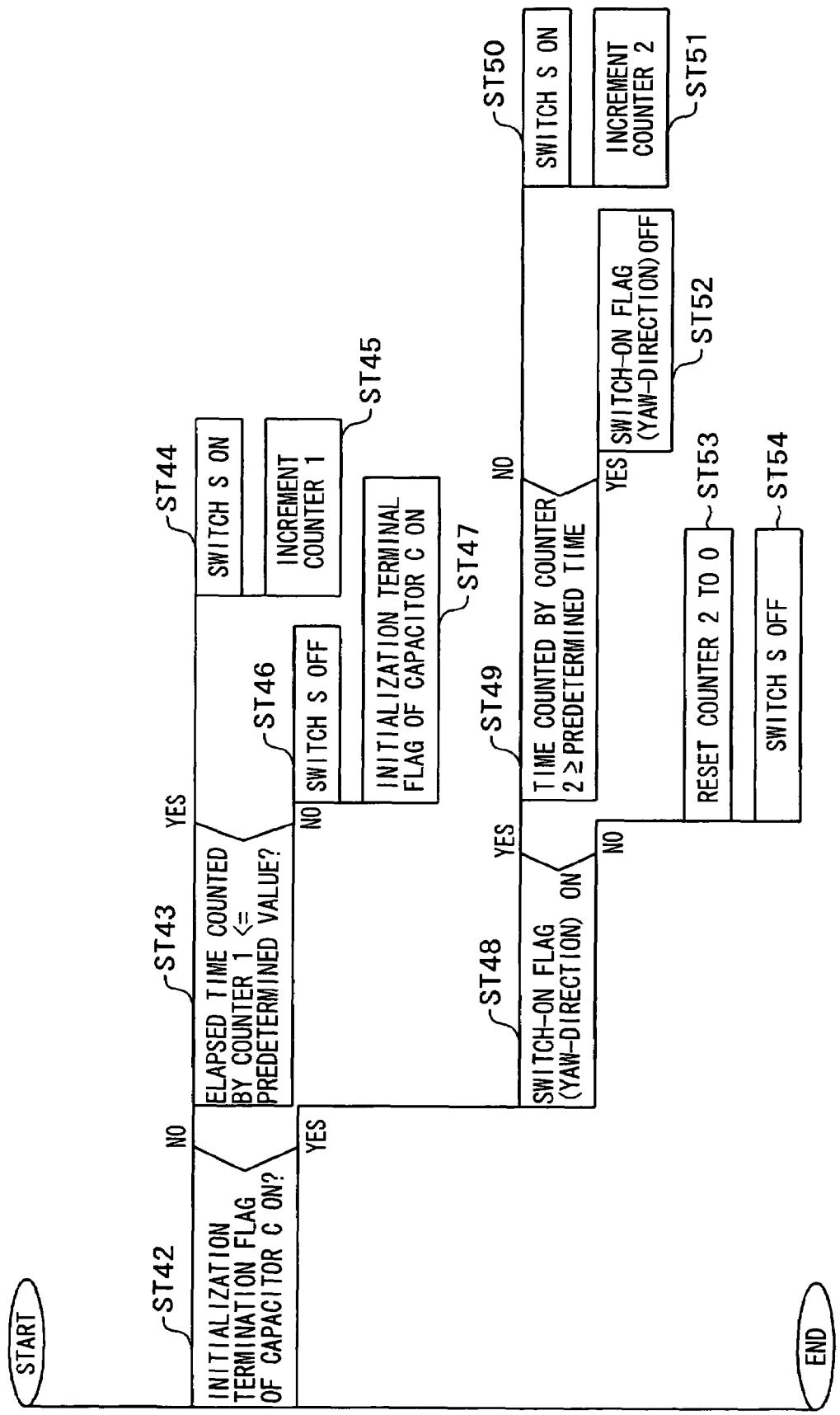

CAMERA SHAKE CORRECTION DEVICE AND IMAGING APPARATUS HAVING THE SAME

CROSS REFERENCE TO RELATED APPLICATIONS

The present document is based on Japanese Priority Application JP2003-002593, filed in the Japanese Patent Office on Jan. 8, 2003, the contents of which being incorporated herein by reference to the extent permitted by law.

BACKGROUND OF THE INVENTION

1. Field of the Invention

The present invention relates generally to a camera shake correction device and an imaging apparatus having this camera shake correction device. More particularly, the present invention relates to a camera shake correction device for use in an imaging apparatus having a camera shake correcting function, which is improved in such a way as to be able to quickly perform the camera shake correcting function when detecting panning or tilting, and also relates to an imaging apparatus having this camera shake correction device.

2. Description of the Related Art

As shown in FIG. 6, an imaging apparatus having a conventional camera shake correction device has a sensor section 111, a camera shake correction device 113, and an image controlling section 127 (see Japanese Patent Application Publication Laid-Open No. 11-289489, page 4 and FIG. 1). The sensor section 111 has attached to a camera body a means for detecting a movement of a camera, such as an angular velocity sensor, an angular acceleration sensor, an angle sensor, and an acceleration sensor (in FIG. 6, an angular velocity sensor is shown as an example thereof). The camera shake correction device 113 performs camera shake correction by detecting panning or tilting according to an angular velocity signal Vout outputted from the sensor section 111 and to a reference voltage Vref. The image controlling section 127 is of a type that drives part or all of an optical system according to a control signal outputted from the camera shake correction device 113 to thereby change an optical axis thereof, or of another type that performs correction by changing segmentation positions at each of which pixels on CCDs are segmented. FIG. 6 shows an image controlling section 127 of the former type by way of example.

The sensor section 111 contains a constant-voltage power supply 112. A reference voltage Vref is applied from this constant-voltage power supply 112 to a resistor 118, which constitutes a high-pass filter 116 of an analog circuit 114, and to a resistor 121 connected to an operational amplifier 119.

The camera shake correction device 113 has an analog circuit 114, an A/D converter 122, and a control section 123. The analog circuit 114 receives the angular velocity signal Vout and the reference voltage Vref from the sensor section (an angular velocity sensor) 111 and then amplifies the signal Vout and the voltage Vref. The A/D converter 122 converts the signal, which is amplified by this analog circuit 114, into a digital value. The control section 123 is constituted by a microcomputer that detects a camera shake, or a panning or tilting (hereunder sometimes referred to as a pan/tilt) operation from a signal representing a digital value converted by the A/D converter 122.

The image controlling section 127 has a drive circuit 128, a drive coil 129, and a variable angle prism 130. The drive circuit 128 drives the variable angle prism 130 according to a control signal sent from the camera shake correction device 113. The drive coil 129 moves the prism 130 according to a signal outputted from this drive circuit 128. The variable angle prism 130 is formed by connecting outer peripheral parts of a first optical plate 131 and a second optical plate 132, each of which is made of transparent glass, through a bellows-like member 133 and by then injecting a high-refractive-index transparent solution thereinto.

The analog circuit 114 constituting the camera shake correction device 113 nearly has a low-pass filter (LPF) 115, a high-pass filter 116, and an operational amplifier 119. The low-pass filter 115 receives an angular velocity signal Vout from the sensor section (the angular velocity sensor) 111 and transmits low-frequency components thereof. The reference voltage Vref is supplied to a common ground of the high-pass filter 116. The low-frequency components of the angular velocity signal Vout are supplied to a capacitor 117 of the high-pass filter 116, which is connected in series to the low-pass filter 115. A connection point between the capacitor 117 and the resistor 118 of the high-pass filter 116 is connected through an output terminal thereof to a non-inverting input terminal of the operational amplifier 119. An intermediate point between resistor 120 and the resistors 121 is connected to an inverting input terminal of the operational amplifier 119.

The control section 123 has a camera-shake/pan/tilt detection section 124 connected to an output of A/D converter 122, and also has a variable gain amplifier 125 whose gain changes according to an output of the camera-shake/pan/tilt detection section 124, and an integrating circuit 126 connected to an output of the variable gain amplifier 125.

The camera-shake/pan/tilt detection section 124 has a function of detecting panning/tilting by utilizing the angular velocity signal Vout sent from the sensor section (the angular velocity sensor) 111 and the reference voltage Vref supplied therefrom. The camera-shake/pan/tilt detection section 124 detects a panning or tilting by comparing an A/D-converted value of an output of the operational amplifier 119 with a predetermined threshold value, as will be described later.

In the imaging apparatus having the conventional camera shake correction device of the above-mentioned configuration, when the camera body is moved by, for example, a camera shake, information concerning an angular velocity is detected by the sensor section (the angular velocity sensor) 111.

The detected information concerning the angular velocity is supplied to the high-pass filter 116 as the angular velocity signal Vout after transmitted through the low-pass filter 115.

In the camera shake correction device 113, an offset of the angular velocity signal Vout from the reference voltage Vref is eliminated by the high-pass filter 116.

An output signal of the high-pass filter 116 is amplified by the operational amplifier 119 in a subsequent stage. Then, the amplified output signal is converted by the A/D converter 122 into a digital signal that is subsequently supplied to the control section 123.

Then, in the control section 123, the camera-shake/pan/tilt detection section 124 detects according to an A/D-converted value outputted from the A/D converter 122 which of a camera shake and panning/tilting causes the camera to move.

A result of this detection is supplied to the variable gain amplifier 125 and determines a gain of this variable gain amplifier 125.

An output signal of the variable gain amplifier 125 is inputted to the integrating circuit 126, in which information concerning an angular velocity is converted into information concerning an angle. Subsequently, a signal representing the information concerning an angle is outputted therefrom to the drive circuit 128 as a control signal.

Then, an output signal of the drive circuit 128 is supplied to the drive coil 129 serving as a winding coil of an electromagnetic actuator, so that the variable angle prism 130 is driven.

Incidentally, the drive circuit 128 controls the variable angle prism 130 in such a way as to change tilt angles of the first optical plate 131 and the second optical plate 132. Thus, the imaging apparatus performs optical correction to be achieved by bending an optical axis of the variable angle prism 130.

Additionally, the imaging apparatus actually requires two camera shake correction devices respectively and separately used for correcting a longitudinal camera shake and a lateral camera shake. For convenience of drawing, only one camera shake correction device is shown in the figure.

Next, a description is given of a method by which the camera-shake/pan/tilt detection section 124 of the camera shake correction device 113 determines whether a detected movement is a camera shake or panning/tilting.

FIGS. 7A and 7B show output signals of the operational amplifier 119, which are inputted to the A/D converter 122. FIG. 7A shows an output waveform signal outputted when causing a camera shake. FIG. 7B shows an output waveform signal outputted when performing panning or tilting.

When causing a camera shake, the output waveform signal keeps oscillating up and down about an output level (hereunder referred to a standstill output level) of the operational amplifier 119 put in a state in which the entire imaging apparatus is completely standstill, as shown in FIG. 7A, whereas when performing panning or tilting, the output waveform signal has a voltage whose value is constantly higher (or lower) than the standstill output level, as shown in FIG. 7B. By the way, when performing panning or tilting in an opposite direction, the output waveform signal has a waveform, which is reverse to that shown in FIG. 7B.

As described above, the camera-shake/pan/tilt detection section 124 utilizes differences in properties between a camera shake and panning/tilting and detects panning/tilting by preliminarily setting a certain threshold value therefore to be compared with a voltage level of an output signal of the operational amplifier 119.

SUMMARY OF THE INVENTION

However, when performing panning or tilting, the level of the signal remains at one of upper and lower limit values of a sensor output voltage. Thus, electric charges are accumulated in the capacitor constituting the high-pass filter in the analog circuit of the camera shake correction device, which has been described as a conventional one, in such a way as to be unevenly distributed therein. In this sense, conventional camera shake correction devices have drawbacks in that, needless to say, a camera shake cannot accurately be detected under such condition, and that camera shake correction cannot be performed accurately.

Accordingly, the present invention has been conceived so as to enable a camera shake correction device to accurately and quickly perform camera shake correction by resetting, when it is detected that panning or tilting is taken place, charges accumulated in the capacitor constituting the high-pass filter to thereby eliminate irregular distribution of charges in the capacitor.

According to a preferred embodiment of the present invention, a camera shake correction device and an imaging apparatus having with this camera shake correction device have the following configurations.

According to a preferred embodiment of the present invention, there is provided a camera shake correction device (hereunder referred to as a first device), which has a sensor for detecting movement of a camera body, and a high-pass filter including a circuit having a capacitor and a resistor connected in series. In the first device, a reference voltage is inputted to a common ground terminal of the circuit. An output signal of the sensor is inputted to the capacitor. The first device further has an amplifier for amplifying an output signal inputted thereto from a connection point between the capacitor and the resistor of the high-pass filter, an A/D converter for converting a signal, which is amplified by the amplifier, into a digital value, a camera-shake/pan/tilt detection means for detecting a camera shake, a panning, or a tilting according to a signal representing the digital value converted by the A/D converter, and switching means for, when the camera-shake/pan/tilt detection means detects panning or tilting, discharging the capacitor constituting the high-pass filter to the reference voltage.

According to another preferred embodiment of the first device, the switching means may charge the capacitor to the reference voltage by turning on the switch when a power supply is turned on.

According to another preferred embodiment of the first device, the sensor may be angular velocity detection means.

According another preferred embodiment of the present invention, there is provided a camera shake correction device (hereunder referred to as a second device), which has a sensor for detecting movement of a camera body, and a high-pass filter including a circuit having a capacitor and a resistor connected in series. In the first device, a reference voltage is inputted to a common ground terminal of the circuit. An output signal of the sensor is inputted to the capacitor. The first device further has an amplifier for amplifying an output signal inputted thereto from a connection point between the capacitor and the resistor of the high-pass filter, an A/D converter for converting a signal, which is amplified by the amplifier, into a digital value, a camera-shake/pan/tilt detection means for detecting a camera shake, a panning, or a tilting according to a signal representing the digital value converted by the A/D converter, and switching means for discharging the capacitor of the high-pass filter at the reference voltage, if panning and/or tilting is detected by the detection means and the condition continues for a period of time.

According to another preferred embodiment of the second device, the switching means may charge the capacitor to the reference voltage by turning on the switch when a power supply is turned on.

According to another preferred embodiment of the second device, the sensor may be angular velocity detection means.

According to another preferred embodiment of the present invention, there is provided an imaging apparatus (hereunder referred to as a first apparatus) including a camera shake correction device that has a function of detecting a panning or tilting and a camera shake and performing camera shake correction when deciding that a camera shake occurs. This camera shake correction device has a sensor for detecting movement of a camera body, and a high-pass filter including a circuit having a capacitor and a resistor connected in series. In this camera shake correction device, a reference voltage is inputted to a common ground terminal of the circuit. An output signal of the sensor is inputted to the capacitor. This camera shake correction device further has an amplifier for amplifying an output signal inputted thereto from a connection point between the capacitor and the resistor of the high-pass filter, an A/D converter for converting a signal, which is amplified by the amplifier, into a digital value, a camera-shake/pan/tilt detection means for detecting a camera shake, a panning, or a tilting according to a signal representing the digital value converted by the A/D converter, and switching means for discharging the capacitor of the high-pass filter at the reference voltage, if panning and/or tilting is detected by the detection means.

According to another preferred embodiment of the first apparatus, the switching means constituting this camera shake correction device may charge the capacitor to the reference voltage by turning on the switch when a power supply is turned on.

According to another embodiment of the first apparatus, the sensor may be angular velocity detection means.

According another preferred embodiment of the present invention, there is provided an imaging apparatus (hereunder referred to as a second apparatus) including a camera shake correction device that has a function of detecting a panning or tilting and a camera shake and performing camera shake correction when deciding that a camera shake occurs. This camera shake correction device has a sensor for detecting movement of a camera body, and a high-pass filter including a circuit having a capacitor and a resistor connected in series. In this camera shake correction device, a reference voltage is inputted to a common ground terminal of the circuit. An output signal of the sensor is inputted to the capacitor. This camera shake correction device further has an amplifier for amplifying an output signal inputted thereto from a connection point between the capacitor and the resistor of the high-pass filter, an A/D converter for converting a signal, which is amplified by the amplifier, into a digital value, a camera-shake/pan/tilt detection means for detecting a camera shake, a panning, or a tilting according to a signal representing the digital value converted by the A/D converter, and switching means for discharging the capacitor of the high-pass filter at the reference voltage, if panning and/or tilting is detected by the detection means and the condition continues for a period of time.

According to another preferred embodiment of the second apparatus, the switching means constituting this camera shake correction device may charge the capacitor to- the reference voltage by turning the switch on when a power supply is turned on.

According to another embodiment of the second apparatus, the sensor may be angular velocity detection means.

Thus, when it is detected according to an output signal of the sensor for detecting movement of the camera body that a panning or a tilting is taken place, it is decided whether or not electric charges accumulated in the capacitor of the high-pass filter are unevenly distributed therein. In a case where the accumulated electric charges are unevenly distributed therein, the capacitor is discharged to the reference voltage. Thus, the unevenness of the distribution of the charges in the capacitor is eliminated. Consequently, a process to be performed by the apparatus can immediately be changed to camera shake correction.

When it is detected according to an angular velocity signal that a panning or a tilting is taken place, it is decided whether or not electric charges accumulated in the capacitor of the high-pass filter are unevenly distributed therein. In a case where the accumulated electric charges are unevenly distributed therein, the capacitor is discharged to the reference voltage. Thus, the unevenness of the distribution of the charges in the capacitor is eliminated. Consequently, the process to be performed by the apparatus can immediately be changed to camera shake correction.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which:

FIG. 2 shows an explanatory view illustrating a state, in which electric charges are accumulated in a capacitor C according to an angular velocity signal Vout when a pan/tilt occurs, according to a preferred embodiment the present invention;

FIG. 3 shows an explanatory view illustrating how panning/tilting is detected according to a stuck condition threshold value when a camera is made swing leftward/rightward, according to a preferred embodiment the present invention;

FIGS. 4A and 4B show flowcharts each illustrating pan/tilt detection processing, switch-on flag processing, and switch on/off processing to be performed by a camera-shake/pan/tilt detection section, according to a preferred embodiment the present invention;

FIG. 5 shows a flowchart illustrating the switch on/off processing, according to a preferred embodiment the present invention;

DETAILED DESCRIPTION OF THE PREFERRED EMBODIMENTS OF THE INVENTION

Hereinafter, preferred embodiments of a camera shake correction device and an imaging apparatus having this camera-shake correction device according to the present invention will be described in detail by referring to the accompanying drawings, in which an angular sensor is used as means for detecting movement of a camera body and in which a method of driving part of an optical system and changing an optical axis thereof is used in an image controlling section,.

Figure 1:
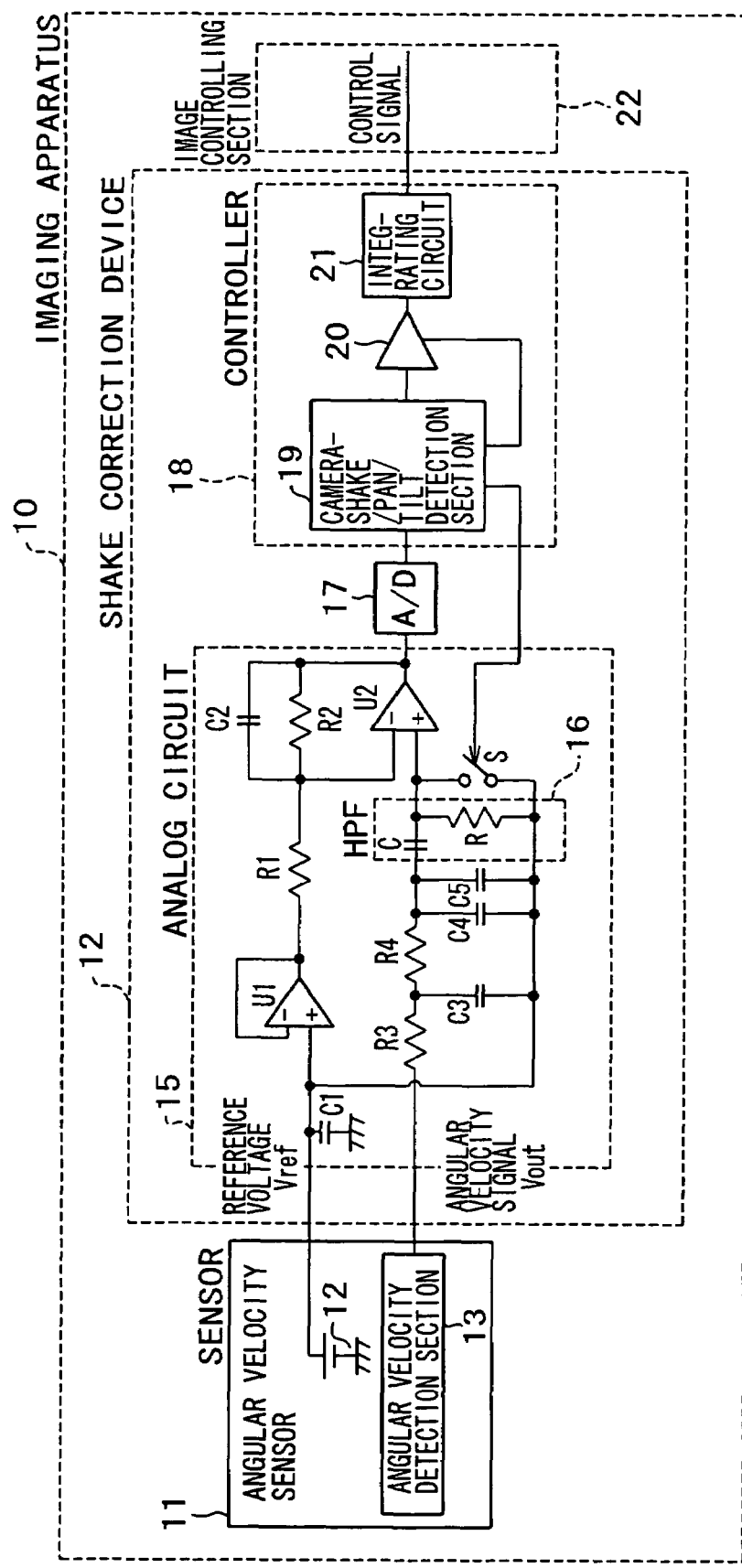
FIG. 1 shows a schematic block diagram illustrating an imaging apparatus having a camera shake correction device according to a preferred embodiment the present invention.
Figure 6:
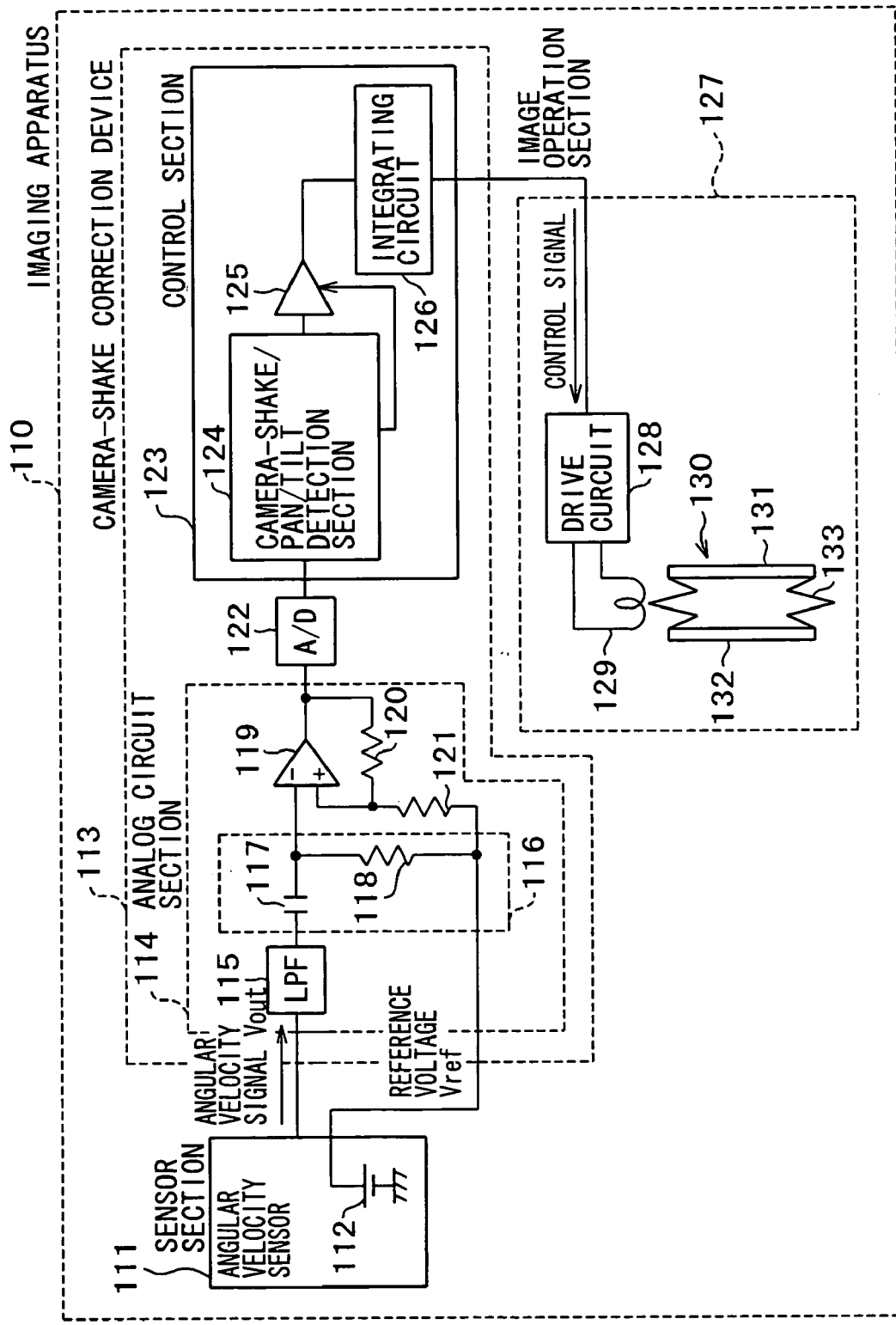
FIG. 6 shows a block diagram illustrating an imaging apparatus having a conventional camera-shake correction device.
Figure 7A:
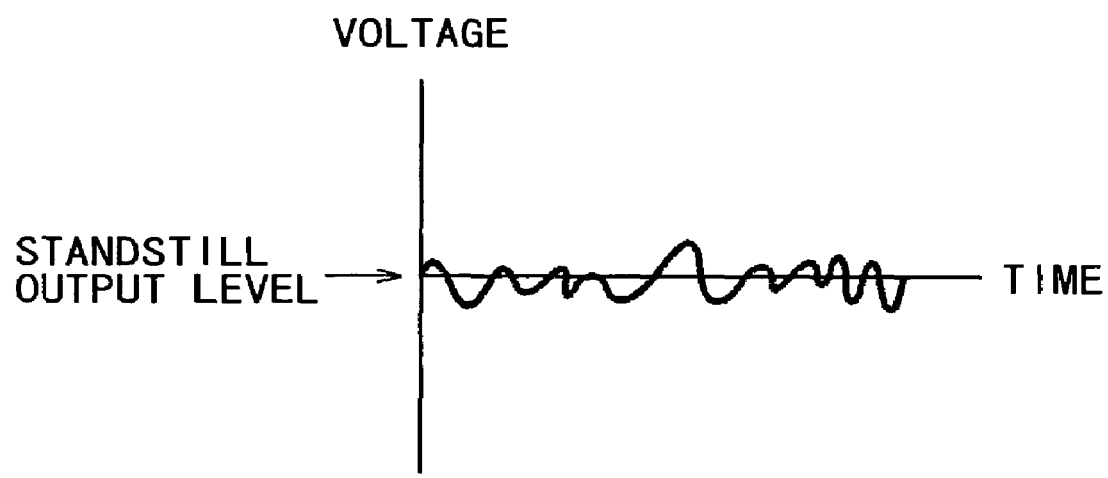
FIGS. 7A and 7B show explanatory views illustrating a state in which an angular velocity signal is outputted when a camera is caused by panning to laterally swing.
Figure 7B:
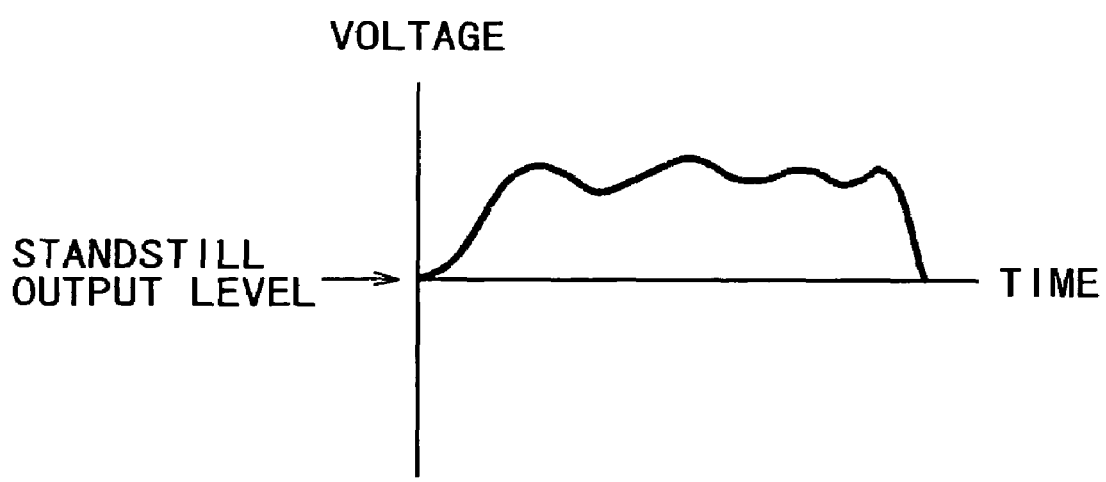

As shown in FIG. 1, an imaging apparatus having a camera shake correction device according to a preferred embodiment of the present invention has a sensor section 11, a camera shake correction device 12, and an image controlling section 22. The sensor section 11 has an angular velocity detection section 13 attached to a casing of a camera body. The camera shake correction device 12 detects panning/tilting according to an output signal (an angular velocity signal) Vout of the sensor section 11 and a reference voltage Vref and performs camera shake correction when a pan/tilt is not detected. The image controlling section 22 performs camera shake correction by operating an optical system, which is led to CCDs, according to a control signal sent from this camera shake correction device 12 or by operating an image obtained from CCDs. Drawing of other constituent elements is omitted.

The sensor section 11 has an angular velocity detection section 13 and a constant-voltage power supply that outputs a reference voltage Vref for amplifying this angular velocity detection section 13. The angular velocity detection section 13 is constituted by, for example, sticking an excitation piezoelectric element and a detection piezoelectric element to a rotary vibrator (not shown). A Coriolis force generated by applying torque on the rotary vibrator is taken by the detection piezoelectric element as an AC component of an angular velocity signal.

Usually, a voltage value ranging from 0 to a power supply voltage according to the angular velocity is outputted as a level of the angular velocity signal Vout. The reference voltage Vref is supplied from the angular velocity detection section 13 as an output voltage thereof in a case of occurrence of no camera shake, and serves as a reference of the level of the angular velocity signal Vout. In this example of preferred embodiment of the present invention, in a case where the power supply voltage is 3 volts, the reference voltage Vref is about 1.5 volts. A standstill output level of the angular velocity signal Vout is about 1.5 volts. An output level of the angular velocity signal Vout ranges from about 1.5 volts to about 3 volts according to angular components of the angular velocity, that is, ranges from about 0 volts to about 1.5 volts with respect to the standstill output level.

The camera shake correction device 12 has an analog circuit 15, which receives the angular velocity signal Vout from the sensor section 11 and also receives the reference voltage Vref and amplifies only a predetermined signal, and also has a control section 18 that performs various kinds of signal processing by converting a signal generated at the analog circuit 15 into a digital value.

The analog circuit 15 has an operational amplifier U1, resistors R3 and R4, capacitors C3, C4 and C5, a high-pass filter (HPF) 16, a switch S, a capacitor C2, a resistor R2, and an operational amplifier U2. The reference voltage Vref supplied from the sensor section 11 is inputted to a non-inverting input terminal of the operational amplifier U1. The angular velocity signal Vout outputted from the sensor section 11 is inputted to the resistors R3 and R4. One of terminals of the capacitor C3 is connected to a connection point between the resistors R3 and R4, while the other terminal thereof is connected to the reference voltage Vref at a common ground terminal. The capacitors C4 and C5 are connected in series to an output terminal of the resistor R4 and also connected in parallel to the capacitor C3. The high-pass filter 16 is formed of the capacitor C and the resistor R4, which are connected in series to each other. The switch S is connected in parallel to the resistor R of the high-pass filter 16. The operational amplifier U2 is connected to the resistor R1 through the capacitor C2 and the resistor R2, which are connected in parallel to one another at output terminals thereof. An output terminal of the capacitor C of the high-pass filter 16 is connected to a non-inverting terminal of the operational amplifier U2, while an output terminal of the resistor R1 is connected to an inverting terminal thereof.

The control section 18 is constituted by what is called a microcomputer, and has a camera-shake/pan/tilt detection section 19 connected to an output terminal of the A/D converter 17, and also has a variable gain amplifier 20, whose gain changes according to an output of this camera-shake/pan/tilt detection section 19, and an integrating circuit 21 connected to an output terminal of the variable gain amplifier 20.

The camera-shake/pan/tilt detection section 19 has a function of detecting panning/tilting by utilizing the angular velocity signal Vout sent from the sensor section 11 and the reference voltage Vref supplied therefrom. The camera-shake/pan/tilt detection section 19 detects a panning or tilting by comparing an A/D-converted value of an output of the operational amplifier U2 with a predetermined threshold value.

According to an algorithm for actually detecting panning/tilting, accumulation of electric charges in the capacitor C changes according to an output component of the angular velocity signal Vout with respect to the reference voltage Vref, as illustrated in FIG. 2. This is because the high-pass filter 16 is put in a connection state in which the reference voltage Vref is inputted to the common ground terminal. In the case that a rightward swing of a camera is caused by panning, the angular velocity signal Vout has an output maximum value. Conversely, in the case that a leftward swing of the camera is caused by panning, the angular velocity signal Vout has an output minimum value. At that time, data representing the output maximum value or the output minimum value is converted by the A/D converter into a digital value that is then inputted to the camera-shake/pan/tilt detection section 19.

In this camera-shake/pan/tilt detection section 19, this digital data is compared with a predetermined threshold value, as illustrated in FIG. 3. The output maximum value is compared with a stuck condition threshold value corresponding to the rightward swing. When the output maximum value is higher than this threshold value, the detection section 19 determines that panning (or tilting) is detected. The present example of preferred embodiment of the invention is adapted so that only when a state, in which the output maximum value is higher than the stuck condition threshold value, lasts for a predetermined time, the detection section 19 determines that a panning (or a tilting) is detected.

Conversely, the output minimum value is compared with another stuck condition threshold value corresponding to a leftward swing of the camera. When the output minimum value is lower than this threshold value, the detection section 19 determines that a panning (or a tilting) is detected. The present example of preferred embodiment of the invention is adapted so that only when a state, in which the output minimum value is lower than the stuck condition threshold value, lasts for a predetermined time, the detection section 19 determines that a panning (or a tilting) is detected.

When it is thus determined that a panning (or a tilting) is detected, the switch S is controlled to be put in to a non-state, so that the capacitor C is discharged. Consequently, the apparatus is brought into a condition in which camera correction can readily be performed.

The image controlling section 22 nearly has a drive circuit, a drive coil, and a variable angle prism, which are not shown in the figure, similarly to the above-mentioned related image controlling section. The drive circuit drives the variable angle prism according to a control signal sent from the camera shake correction device 12. The drive coil moves the prism according to a signal outputted from this drive circuit.

In the imaging apparatus 10 having the camera shake correction device 12 of the above-mentioned configuration, when the camera body is moved by, for instance, a camera shake, information concerning an angular velocity is detected by the angular velocity detection section 13.

The detected information concerning the angular velocity is supplied to the high-pass filter 16 as the angular velocity signal Vout.

In the camera shake correction device 12, electric charges corresponding to the component of the angular velocity signal Vout with respect to the reference voltage Vref are accumulated in the capacitor C through the high-pass filter 16.

Accumulation of electric charges in the capacitor C changes according to the output component of the angular velocity signal Vout with respect to the reference voltage Vref, as illustrated in FIG. 2 described above. This is because the high-pass filter 16 is put in a connection state in which the reference voltage Vref is inputted to a common ground terminal thereof. In the case that a rightward swing of a camera is caused by panning, the angular velocity signal Vout has an output maximum value. Conversely, in the case that a leftward swing of the camera is caused by panning, the angular velocity signal Vout has an output minimum value.

An output signal of the high-pass filter 16 is amplified by the operational amplifier U2 in a subsequent stage. Then, the amplified output signal is converted by the A/D converter 17 into a digital signal that is subsequently supplied to the control section 18.

Then, in the control section 18, the camera-shake/pan/tilt detection section 19 detects according to an A/D-converted value outputted from the A/D converter 17 which of a camera shake and panning/tilting causes the camera to move.

An algorithm for detecting panning/tilting is described hereinbelow. Considering a case where panning is taken place, as illustrated in FIG. 3 described above, when a rightward swing of the camera is performed, electric charges corresponding to the output maximum value are accumulated in the capacitor C. Conversely, when a leftward swing of the camera is performed, electric charges corresponding to the output minimum value are accumulated therein. Therefore, preliminarily, values respectively being close to the output maximum and minimum values are set to be stuck condition threshold values. The A/D-converted digital values are compared with the stuck condition threshold values so as to determine whether or not panning is taken place. When the digital values, which meet conditions set by using the threshold values, are constantly sent from the A/D converter 17 for a predetermined time, it is decided that panning is taken place. At that time, the switch S is turned on, so that the capacitor C is discharged. Consequently, upon completion of panning, camera shake correction can quickly be performed. This is similar to the case of detecting tilting.

Then, information representing a result of detection of panning/tilting is supplied to the variable amplifier 20, and used for determining the gain thereof.

An output signal of the variable gain amplifier 20 is inputted to the integrating circuit 21, whereupon information concerning the angular velocity is converted into that concerning an angle. Subsequently, a signal representing this information is outputted therefrom to the image controlling section 22, so that optical correction is performed.

Thus, the camera-shake/pan/tilt detection section 19 detects panning/tilting. When panning/tilting is detected, the device is controlled in such a way as not to perform camera shake correction. According to the example of preferred embodiment of the present invention, it is first detected that an A/D-converted value of a signal level of the output signal of the analog circuit is stuck in a predetermined range from an upper or lower limit value. Then, the switch S is turned on so as to cancel this stuck condition. Thus, the accumulation of electric charges in the capacitor C constituting the high-pass filter 16 is controlled to charge the capacitor C to the reference voltage Vref. Consequently, when the panning or tilting is canceled, camera shake correction can readily be performed.

This camera-shake/pan/tilt detection section 19 can enable quick camera shake correction by turning the switch S on when turning power on to thereby charge the capacitor C constituting the high-pass filter 16 to the reference voltage Vref.

In this way, usually, when turning power on, substantially no charge is accumulated in the capacitor C. Thus, a voltage developed thereacross is close to 0. Therefore, the capacitor C is charged by closing the switch S. Consequently, a necessary camera shake signal can quickly be obtained after power-on.

Generally, camera shake correction employs an algorithm for discriminating a camera shake from a pan/tilt, which is performed in the camera-shake/pan/tilt detection section 19, so as to prevent intentional change of a field angle of a camera by panning or tilting from being corrected.

As above-mentioned, according to this algorithm, in a case where voltage values being more than or less than a certain threshold value are constantly outputted for a predetermined time, panning or tilting is regarded as being detected.

Hereinafter, an operation for quickly performing camera shake correction by turning the switch S on and discharging the capacitor C at detection of panning/tilting is described by referring to FIGS. 4A, 4B, and 5. Incidentally, a case, in which an operation to be detected is panning, is described hereinbelow. The apparatus performs on/off processing on the switch S by using four counters.

As shown in FIG. 4A, a panning detection process is performed in step ST11. As above-mentioned, this panning detection processing is performed by detecting that an output minimum value or an output maximum value of the analog circuit is obtained as a result of storing electric charges due to the angular velocity signal Vout in the capacitor C.

Subsequently, switch-on flag processing is performed in step ST21. This processing is performed as follows. That is, in a case where a direction of swing corresponding to a pan flag coincides with that of swing corresponding to a stuck range in which the A/D-converted value of an output signal level of the analog circuit is stuck, an associated counter is incremented. In a case when a time, in which the A/D-converted value is stuck in this stuck range, is equal to or longer than a predetermined threshold value, a switch-on flag is set.

Next, switch on/off processing is performed in step ST41. This processing is carried out as follows. In initialization when turning power on, a counter 1 is used. For a predetermined time, the switch S is turned on. Thus, the capacitor C is charged to the reference voltage Vref, so that charge-resetting is performed. At a time other than the time of power-on, in a case where the switch-on flag is on, the switch S is turned on for a predetermined time. Thus, the capacitor C is discharged to the reference voltage Vref, so that charge-resetting is performed.

Meanwhile, in the switching-on flag processing, as illustrated in FIG. 4B, detection of panning is taken place. In a case that rightward swing of the camera is performed, and that a pan flag is on (see step ST22), if an amount of electric charges accumulated in the capacitor C corresponds to the output maximum value of the voltage Vout, it is determined in steps ST23 that this panning is a rightward swing of the camera. Then, a counter 3 is incremented in step ST24.

If a pan flag corresponding to a rightward swing is not on in step ST22, it is decided in step ST25 whether or not a pan flag corresponding to a leftward swing is on.

In a case that the pan flag corresponding to a leftward swing is on instep ST25, and that an amount of electric charges accumulated in the capacitor C corresponds to the output minimum value, it is decided in step ST26 that this panning is a leftward swing of the camera. Then, a counter 4 is incremented in step ST27.

In a case where the pan flag corresponding to the leftward swing of the camera is off in step ST25, the counter 3 is reset to 0 in step ST28. The counter 4 is reset to 0 in step ST29.

If the counter 3 is incremented in step ST24, an elapsed time in the stuck condition is measured. In step ST30, it is decided whether or not the counter 3 is equal to or more than the threshold value.

If the counter 3 is equal to or more than the threshold value in step ST30, the switch-on flag is set in step ST31. Subsequently, the switch S is controlled to be turned on.

In a case where the counter 3 is less than the threshold value in step ST30, the counter 4 incremented in step ST27 counts an elapsed time in the stuck condition. Then, in step ST32, it is decided whether the counter 4 is equal to or more than the threshold value.

If the counter 4 is equal to or more than the threshold value in step ST32, the switch-on flag is on in step ST33. Then, the switch S is controlled to be turned on.

Next, the switch on/off processing (see step ST41) is described hereinbelow by referring to a flowchart of FIG. 5.

First, if a termination flag for initialization of the capacitor C is not on in step ST42, it is decided in step ST43 whether the counter 1 counts a predetermined elapsed time.

If it is found in step ST43 that the counter 1 has not counted the predetermined elapsed time, it is decided that the apparatus is in a power-on state. Then, the switch S is turned on in step ST44. Subsequently, in step ST45, the counter 1 is incremented.

If it is found in step ST43 that the counter 1 has counted the predetermined elapsed time, the switch S is turned off in step ST46. Then, the termination flag for initialization of the capacitor C is set in step ST47.

In a case where the termination flag for initialization of the capacitor C is on in step ST42, it is checked in step ST48 whether or not the switch-on flag is on.

If the switch-on flag is on in step ST48, the switch S is turned on in step ST50 when the counter 2 is not more than the predetermined time in step ST49. Thus, the capacitor C is discharged for the predetermined time. Then, the counter 2 is incremented in step ST51.

If the counter 2 is more than the predetermined time in step ST49, the switch-on flag is unset in step ST52. Thus, the discharging of the capacitor C is stopped.

In a case where the switch-on flag is not on in step ST48, the counter 2 is reset to 0 in step ST53. The switch S is turned off in step ST54.

The examples of preferred embodiments of the present invention described in the foregoing specification are for illustrative purposes. Therefore, it is to be understood by those of ordinary skill in the art that any changes, variations, combinations, sub-combinations, adaptations, alterations, etc. of such examples of preferred embodiments maybe practiced otherwise than as specifically described herein without departing from the scope and spirit of the present invention.

What is claimed is:

1. A camera shake correction device comprising:
sensor for detecting movement of a camera body;
high-pass filter, having a circuit including a capacitor and a resistor connected in series, in which a reference voltage is inputted in a common ground terminal of said circuit and an output signal of said sensor is inputted in said capacitor;
amplifier for amplifying an output signal from a connection point between said capacitor and said resistor of said high-pass filter;
A/D converter for converting a signal amplified by said amplifier to a digital value;
detection means for detecting camera shake, panning or tilting based on a signal of said digital value converted by said A/D converter; and
switching means for discharging said capacitor of said high-pass filter at said reference voltage, if panning and/or tilting is detected by said detection means,
wherein, when panning and/or tilting is detected, camera shake detection is not performed and the switching means is put in a position to discharge the capacitor at the reference voltage,
wherein, when panning and/or tilting is not detected, the switching means is put in a position to enable camera shake detection.

2. The camera shake correction device according to claim 1, wherein said switching means charges said capacitor to said reference voltage by turning said switch on, when power supply is turned on.

3. The camera shake correction device according to claim 1, wherein said sensor comprises an angular velocity detection means.

4. A camera shake correction device comprising:
sensor for detecting movement of a camera body;
high-pass filter, having a circuit including a capacitor and a resistor connected in series, in which a reference voltage is inputted in a common ground terminal of said circuit and an output signal of said sensor is inputted in said capacitor;
amplifier for amplifying an output signal from a connection point between said capacitor and said resistor of said high-pass filter;
A/D converter for converting a signal amplified by said amplifier to a digital value;
detection means for detecting camera shake, panning or tilting based on a signal of said digital value converted by said AID converter; and
switching means for discharging said capacitor of said high-pass filter at said reference voltage, if panning and/or tilting is detected by said detection means and said condition continues for a period of times,
wherein, when panning and/or tilting is detected, camera shake detection is not performed and the switching means is put in a position to discharge the capacitor at the reference voltage,
wherein, when panning and/or tilting is not detected, the switching means is put in a position to enable camera shake detection.

5. The camera shake correction device according to claim 4, wherein said switching means charges said capacitor to said reference voltage by turning said switch on, when power supply is turned on.

6. The camera shake correction device according to claim 4, wherein said sensor comprises an angular velocity detection means.

7. An imaging apparatus including a camera shake correction device for detecting panning, tilting and/or camera shake and performing camera shake correction if determining occurrence of camera shake, said camera shake correction device comprising:
- sensor for detecting movement of a camera body;
- high-pass filter, having a circuit including a capacitor and a resistor connected in series, in which a reference voltage is inputted in a common ground terminal of said circuit and an output signal of said sensor is inputted in said capacitor;
- amplifier for amplifying an output signal from a connection point between said capacitor and said resistor of said high-pass filter;
- A/D converter for converting a signal amplified by said amplifier to a digital value;
- detection means for detecting camera shake, panning or tilting based on a signal of said digital value converted by said A/D converter; and
- switching means for discharging said capacitor of said high-pass filter at said reference voltage, if panning and/or tilting is detected by said detection means,
- wherein, when panning and/or tilting is detected, camera shake detection is not performed and the switching means is put in a position to discharge the capacitor at the reference voltage,
- wherein, when panning and/or tilting is not detected, the switching means is put in a position to enable camera shake detection.

8. The imaging apparatus according to claim 7, wherein said switching means of said camera shake correction device charges said capacitor to said reference voltage by turning said switch on, when power supply is turned on.

9. The imaging apparatus according to claim 7, wherein said sensor comprises an angular velocity detection means.

10. An imaging apparatus including a camera shake correction device for detecting panning, tilting and/or camera shake and performing camera shake correction if determining occurrence of camera shake, said camera shake correction device comprising:
- high-pass filter, having a circuit including a capacitor and a resistor connected in series, in which a reference voltage is inputted in a common ground terminal of said circuit and an output signal of said sensor is inputted in said capacitor;
- amplifier for amplifying an output signal from a connection point between said capacitor and said resistor of said high-pass filter;
- A/D converter for converting a signal amplified by said amplifier to a digital value;
- detection means for detecting camera shake, panning or tilting based on a signal of said digital value converted by said A/D converter; and
- switching means for discharging said capacitor of said high-pass filter at said reference voltage, if panning and/or tilting is detected by said detection means and said condition continues for a period of time,
- wherein, when panning and/or tilting is detected, camera shake detection is not performed and the switching means is put in a position to discharge the capacitor at the reference voltage,
- wherein, when panning and/or tilting is not detected, the switching means is put in a position to enable camera shake detection.

11. The imaging apparatus according to claim 10, wherein said switching means of said camera shake correction device charges said capacitor to said reference voltage by turning said switch on, when power supply is turned on.

12. The imaging apparatus according to claim 10, wherein said sensor comprises an angular velocity detection means.

* * * * *